US005999612A

United States Patent [19]
Dunn et al.

[11] Patent Number: 5,999,612
[45] Date of Patent: Dec. 7, 1999

[54] INTEGRATED TELEPHONY AND DATA SERVICES OVER CABLE NETWORKS

[75] Inventors: James M. Dunn, Ocean Ridge, Fla.;
Alan George Ganek, Chappaqua, N.Y.;
Edith Helen Stern, Boca Raton, Fla.;
Barry Edward Willner, Briarcliff Manor, N.Y.

[73] Assignee: International Business Machines Corporation, Armonk, N.Y.

[21] Appl. No.: 08/863,603

[22] Filed: May 27, 1997

[51] Int. Cl.[6] .............................. H04M 3/42; H04M 1/00
[52] U.S. Cl. ....................... 379/212; 379/90.01; 379/220; 379/207; 348/12; 348/552
[58] Field of Search .................... 348/552, 6, 12, 348/13, 46, 461, 462, 7, 10; 379/88.17, 90.01, 93.01, 93.09, 93.14, 110.01, 201, 207, 211, 212, 220, 900, 901, 902, 102.02, 102.03

[56] References Cited

U.S. PATENT DOCUMENTS

| | | | |
|---|---|---|---|
| 5,142,532 | 8/1992 | Adams .................................... | 370/432 |
| 5,189,673 | 2/1993 | Burton et al. ........................... | 370/490 |
| 5,247,347 | 9/1993 | Litteral et al. ............................... | 348/7 |
| 5,303,229 | 4/1994 | Withers et al. ......................... | 370/490 |
| 5,341,415 | 8/1994 | Baran ..................................... | 379/201 |
| 5,381,459 | 1/1995 | Lappington ............................ | 455/426 |
| 5,414,773 | 5/1995 | Handelman ............................... | 380/49 |
| 5,421,030 | 5/1995 | Baran ...................................... | 455/5.1 |
| 5,473,679 | 12/1995 | La Porta et al. ....................... | 379/201 |
| 5,481,542 | 1/1996 | Logston et al. .............................. | 348/7 |
| 5,544,164 | 8/1996 | Baran ..................................... | 370/397 |
| 5,550,820 | 8/1996 | Baran ..................................... | 370/395 |
| 5,563,938 | 10/1996 | Soshea et al. .......................... | 379/201 |
| 5,563,939 | 10/1996 | La Porta et al. ....................... | 379/220 |
| 5,574,778 | 11/1996 | Ely et al. ................................ | 379/207 |
| 5,574,779 | 11/1996 | Ely et al. ................................ | 379/207 |
| 5,579,311 | 11/1996 | Chopping et al. ...................... | 370/352 |
| 5,583,927 | 12/1996 | Ely et al. ................................ | 379/207 |
| 5,629,978 | 5/1997 | Blumhardt et al. .................... | 370/271 |
| 5,715,305 | 2/1998 | Penzias et al. ......................... | 379/220 |
| 5,745,702 | 4/1998 | Morozumi ......................... | 395/200.79 |
| 5,778,056 | 7/1998 | Ely et al. ................................ | 379/207 |
| 5,809,252 | 9/1998 | Beighe et al. .......................... | 395/200 |
| 5,828,666 | 10/1998 | Focsaneanu et al. ................... | 370/389 |
| 5,838,665 | 11/1998 | Kahn et al. ............................. | 370/260 |
| 5,848,143 | 12/1998 | Andrews et al. ....................... | 379/219 |

*Primary Examiner*—Krista Zele
*Assistant Examiner*—Roland G. Foster
*Attorney, Agent, or Firm*—Richard A. Tomlin; Robert Lieber

[57] ABSTRACT

A newly developed computer adapter and call routing system allow for cable television networks (or other broadband networks) to offer digital telephony services seamlessly; i.e. in a manner such that a user receiving the service is unaware of any difference between that service and comparable telephone services presently supported by the public switched telephone network (PSTN). The adapter attaches to a computer, one or more telephones, the PSTN, and the broadband network. During utility power outages, switch circuitry in the adapter connects attached devices directly to lines in the PSTN, so that existing power support functions of the PSTN are fully utilizable. At other times, the adapter conditionally routes outgoing telephone calls from the attached devices to either the PSTN or cable network. Conditions determining the routing of outgoing calls can be set by users and also determined automatically (e.g. as logical functions of called numbers). At a signal concentration office in the broadband network (e.g. at head end of a cable network), a gateway system having newly defined telephone call handling capabilities provides connections to other networks, the latter including the PSTN, Internet and private broadband networks (e.g. leased channels on satellite radio networks). The resulting arrangement allows for a business "telecommuter" to receive telephone services seamlessly, both at home and in business facilities remote from home.

13 Claims, 11 Drawing Sheets

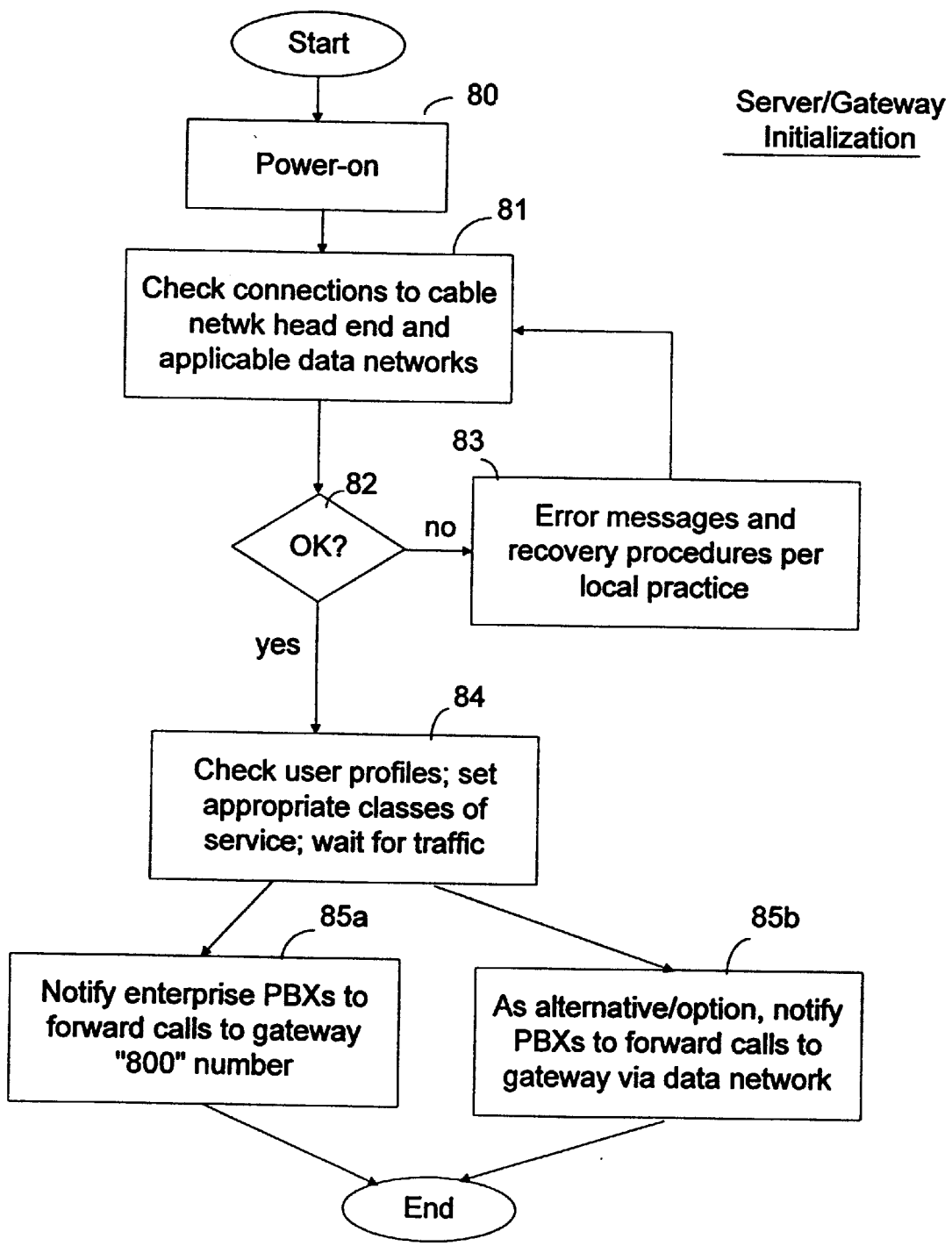

to Fig. 7b

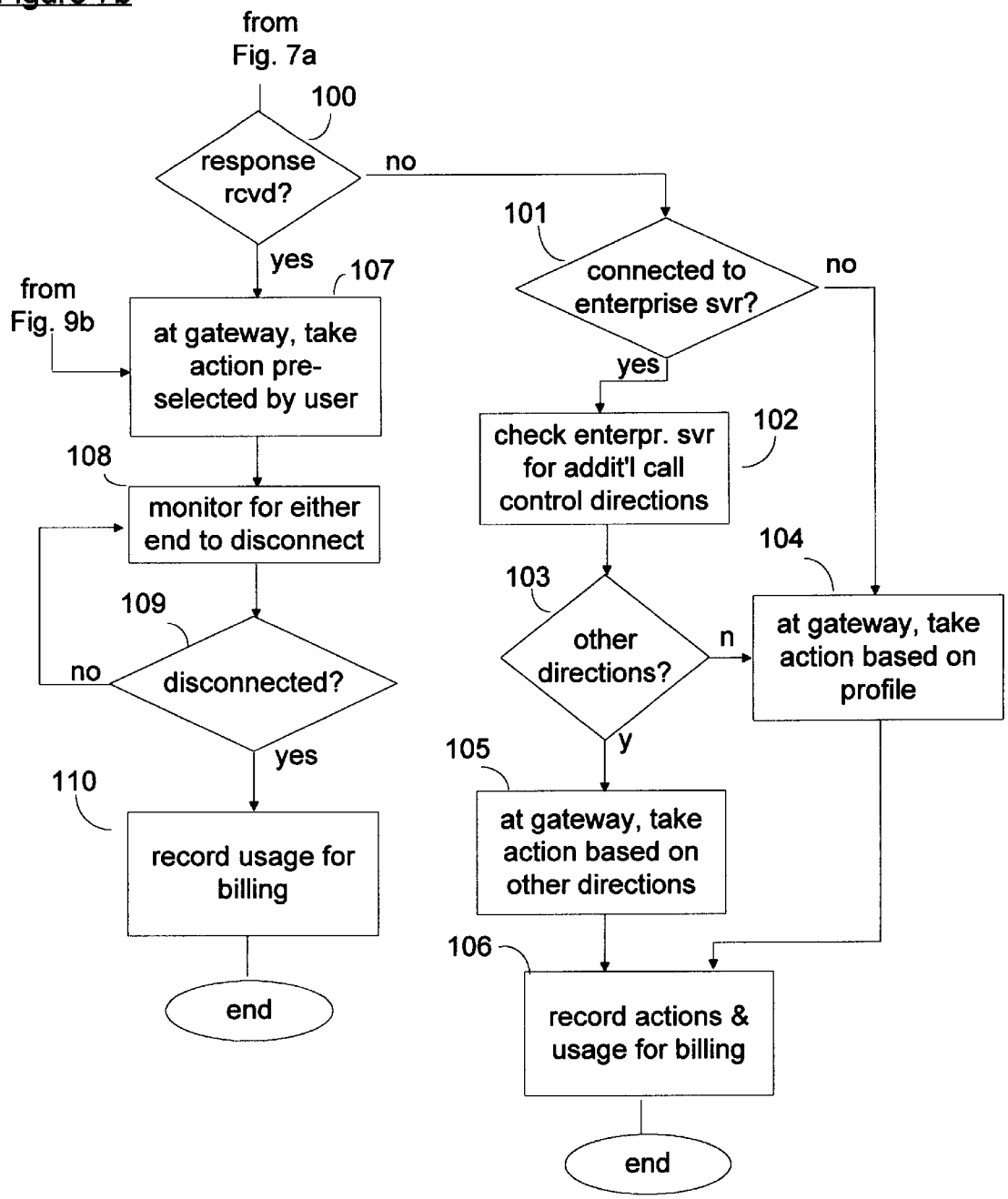

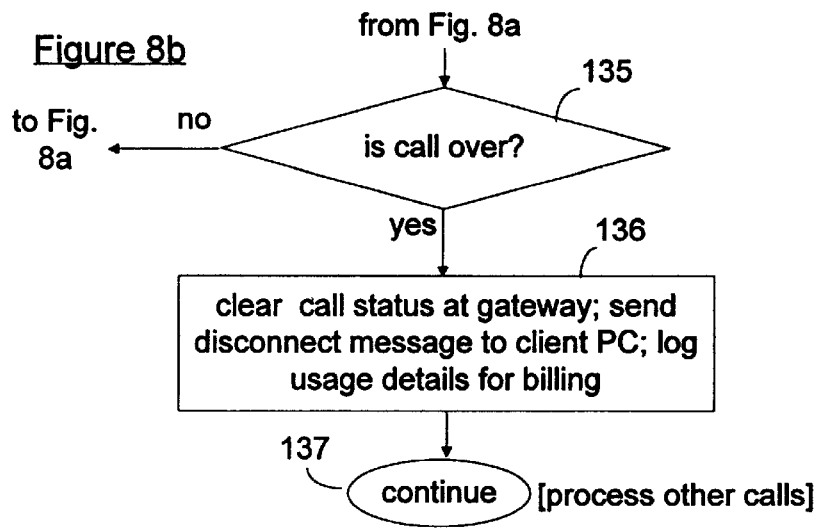
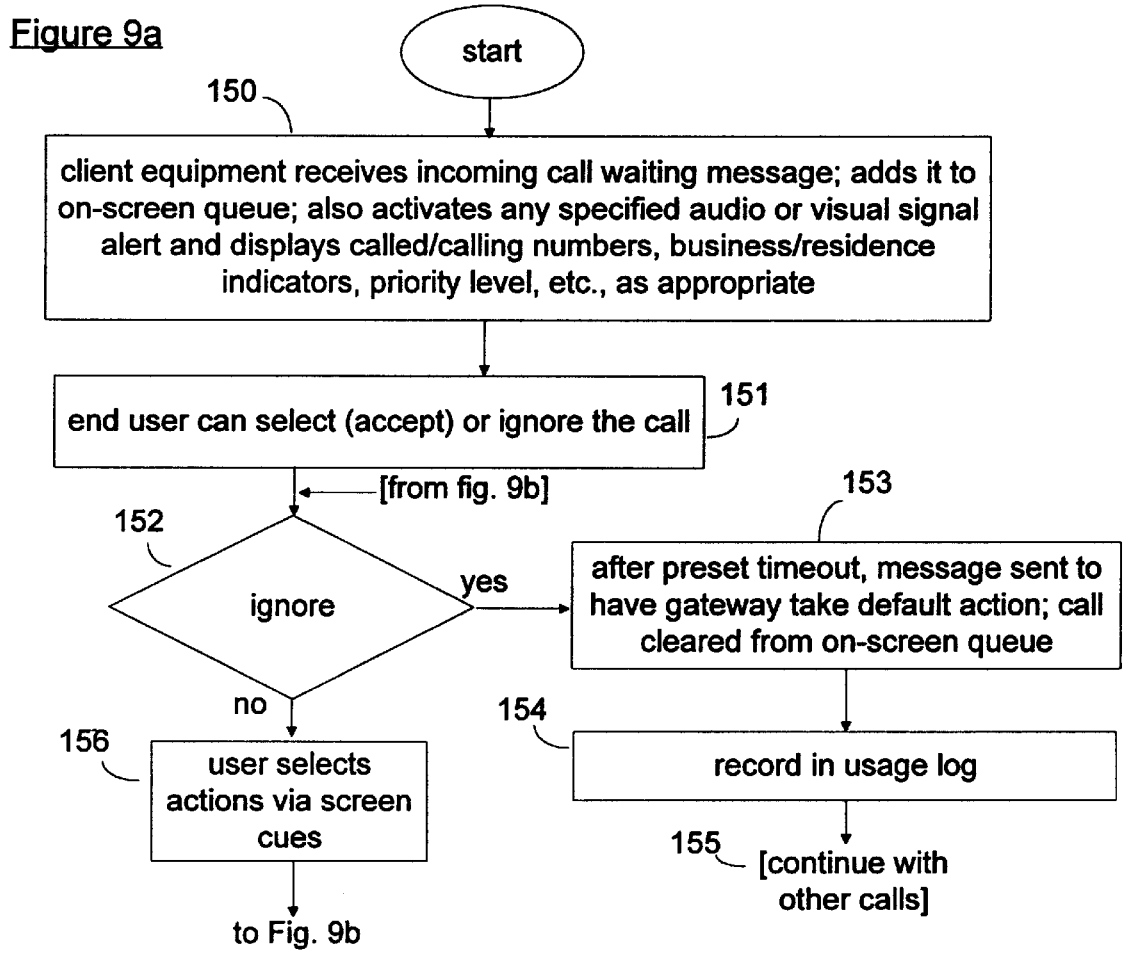

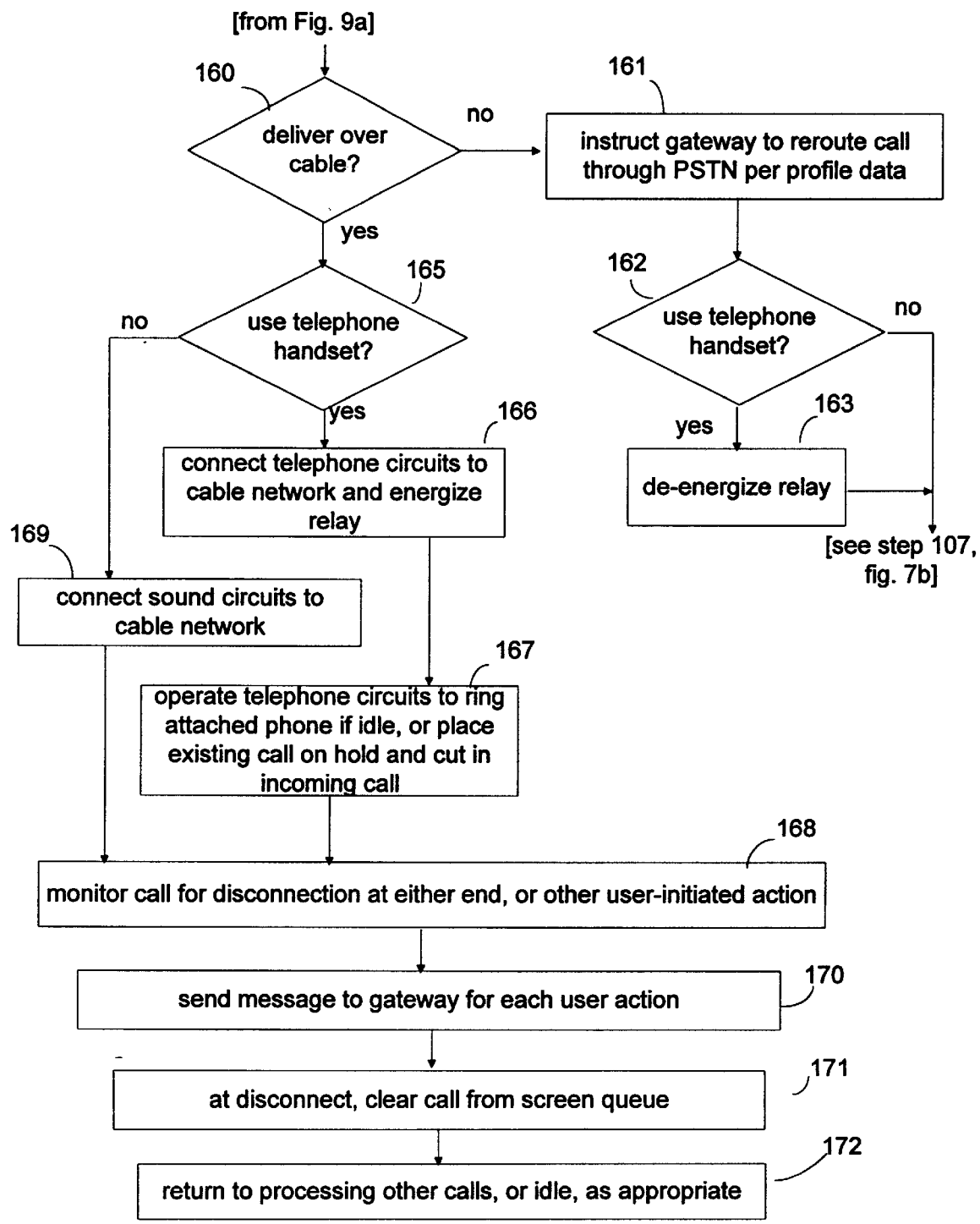

INTEGRATED TELEPHONY AND DATA SERVICES OVER CABLE NETWORKS

CROSS-REFERENCES TO RELATED APPLICATIONS

1. Patent application Ser. No. 08/835,147 filed Apr. 14, 1997 for T. Creamer et al, entitled Access to Extended Telephone Services Via the Internet, discloses adaptation of the public switched telephone network(PSTN) to provide extended telephone services to its users via the Internet.
2. Patent application Ser. No. 08/761,257 filed Dec. 6. 1996 for J. M. Dunn et al, entitled User Invocation of Services in Public Switched Telephone Network Via Parallel Data Network, discloses provision of interfaces between the PSTN and other networks (e.g. the Internet and Web) enabling PSTN users to administer telephone services in the PSTN through the other networks.

BACKGROUND OF THE INVENTION

Today, it is common for communication networks other than the public switched telephone network (PSTN) to provide telephony services. For example, such as the Internet and world wide web now support such services. Notably, however, today's broadband carriers of residential transmissions—e.g. cable television networks—do not support telephone services. One reason for this is that such networks have been designed basically as alternatives to broadcast television. Consequently, cable network equipment and distribution facilities traditionally have been structured primarily to deliver television signals unidirectionally from a "head end", where television signals are received and assembled for delivery, to residential customers.

In some cable networks, data is carried "upstream" from customers to the head end; for example, data indicating acceptance of pay-per-view programs and requiring changes of decoding parameters at decoder equipment located at customer sites, etc. However, this involves low usage/low data rate activities over a channel shared by all customer units receiving service over common branch and trunk lines; typically, in an operation much like that of a packet network LAN (local area network) with common bridges and routers.

Recently announced broadband modems theoretically would seem to allow for expanded services on cable networks, encompassing bidirectional transfer of generalized voice and data communications between customer sites and head ends. It has been noted that it could take "at least five years " to "complete" what is characterized as the revolution required to produce suitable cable facilities. Although cable distribution networks in many areas have been upgraded from coaxial to fiber optic transmission lines, the latter having greater bandwidth capacities, the fiber optic is usually located between head ends and "neighborhood" distribution points, and coaxial cables still run between these points and customer premises. Thus, the bandwidth available for all transmissions is still that of coaxial cable; not optical fiber.

A presently recognized problem or obstacle, in respect to use of cable networks for telephony, is the need for "seamless" integration with existing telephony functions. To compete with the PSTN and Internet, an adaptation of cable networks to support telephony should allow for direct dialing of telephone calls in a manner fully consistent with existing direct dialing processes of the PSTN; so that users of cable telephone services would not require new telephone numbers, or use of digits in addition to their present PSTN telephone numbers, or contact with operators or representatives, for telephone activities that presently do not require such functions.

Another need presently recognized (at least by the present inventors) is that a competitive cable telephony service should include provision for maintaining at least emergency service during power outages. However, an obstacle to this is that cable networks cannot practically supply power to their "telephone" users the way telephone companies now do.

Our invention provides solutions to the foregoing problems and obstacles, by allowing for seamless and effective integration of telephone services into cable networks and/or other broadband networks.

SUMMARY OF THE INVENTION

Our solution is to provide a special server/gateway for broadband networks, such as cable television networks, and unique adapters for residences served by these networks. In its preferred form, our adapter is a card internally installed in a computer. In addition to the computer, this adapter connects to the PSTN, the broadband network (or a modem connecting to that network), and one or more telephones. The logic in the adapter is designed to allow for diverse routing of telephone service between any attached telephone and either the PSTN or broadband network, as well as diverse routing of data communication services between an attached computer and the aforesaid networks.

Furthermore, the adapter contains a switch providing a default connection to the PSTN during electric utility power outages, so as to ensure uninterrupted availability of telephone system power and services during such occurrences.

Furthermore, the adapter and broadband network server are designed to provide for isochronal handling of telephone calls through the broadband network, when such handling is needed and an alternative to PSTN telephony is also required.

When utility power is effective, logic in the adapter operates to route individual outgoing telephone calls through either the PSTN or the broadband network. This routing may be established as a function of the called number per se and/or as a function of conditions present by the end user of the adapter.

The server for the broadband network operates to link that network and its users to the PSTN and other networks, the latter networks including the Internet.

These and other features, advantages and benefits of the invention will be more fully understood and appreciated from the descriptions to follow.

Although application of the invention to broadband networks is specifically described here with reference to cable networks, it will be understood that the invention has potential applicability to other broadband networks, including networks wholly contained within the PSTN.

BRIEF DESCRIPTION OF THE DRAWINGS

FIG. 6 is a flow diagram illustrating initialization of a cable network server/gateway used in the invention.

FIGS. 7a and 7b, considered together, constitute a flow diagram of how the server/gateway of FIG. 6 handles incoming telephone calls (calls directed from external networks to end users of cable network services).

FIGS. 8a and 8b, considered together, constitute a flow diagram of how the server/gateway of FIG. 6 handles outgoing telephone calls (calls directed from cable network end users to external networks).

FIGS. 9a and 9b together constitute a flow diagram of how equipment used by cable network end-users operates to process incoming telephone calls.

DETAILED DESCRIPTION

1. Introduction

Figure 1A:
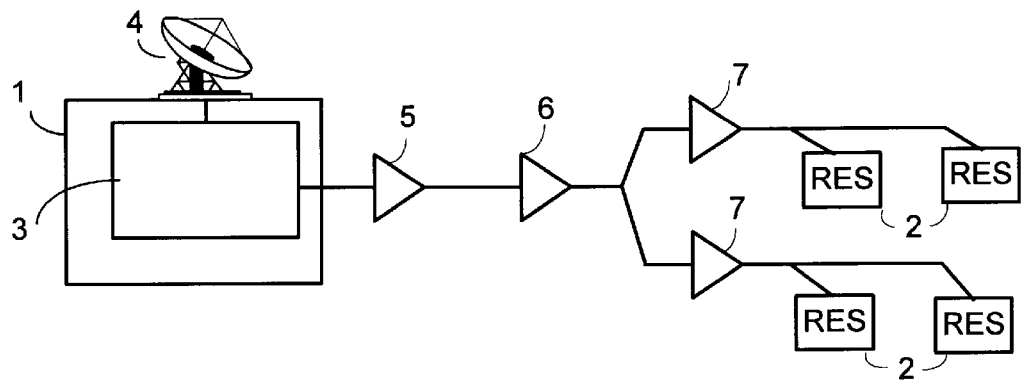
FIG. 1A is a schematic representation of existing cable networks having all coaxial transmission lines.
Figure 1B:
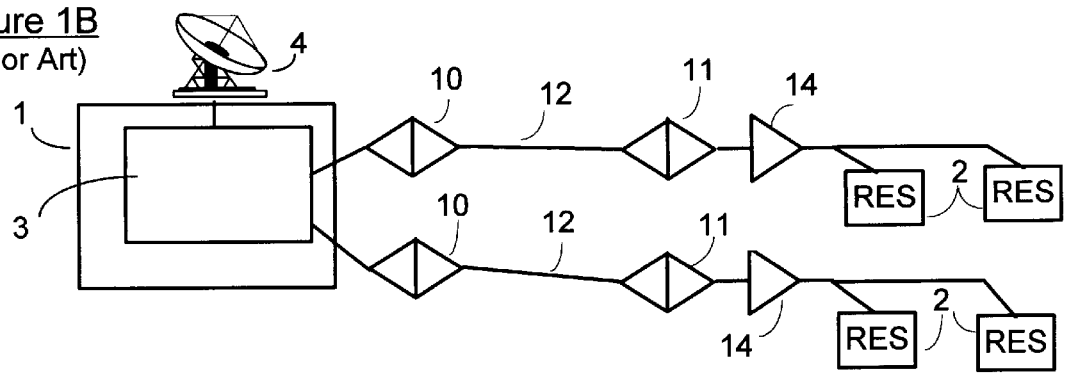
FIG. 1B is a schematic representation of existing cable networks having fiber optic lines between head end offices and neighborhood distribution junctions and coaxial lines between the distribution junctions and end-user sites.

Although it is believed that the invention would integrate compatibly into almost any broadband residential communication system, it is described with specific reference to cable television distribution systems. FIGS. 1A and 1B show infrastructures of existing cable networks. FIG. 1A shows networks using only coaxial lines and FIG. 1B shows networks using both fiber optic and coaxial lines.

In both FIGS. 1A and 1B, the head end office of the cable network is shown at 1, residences (and/or other structures) served by the network are shown at 2, signal conversion equipment associated with television program distribution is shown at 3, and a source of television program signals, in the form of a satellite dish antenna, is shown at 4.

In FIG. 1A, television signals are distributed to residences 2 through coaxial lines and trunk amplifiers 5, splitters 6, and feed amplifiers 7.

In FIG. 1B, signals are distributed (bidirectionally) through laser transceivers 10 and 11, respectively located at head end and neighborhood junctions, via fiber optic cable 12. Between neighborhood junctions and residences, signals are conveyed through bidirectional feed amplifiers 14 and coaxial lines.

2. System of Invention—General

Figure 2:
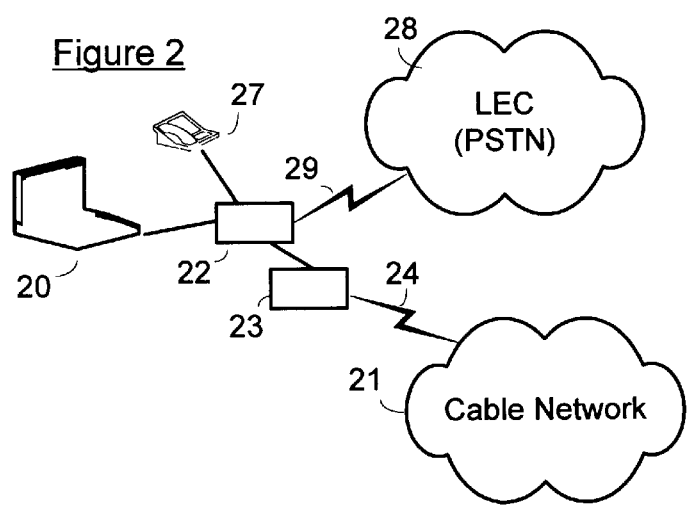
FIG. 2 is a schematic showing how the present invention is implemented in the environment of FIG. 1B.

FIG. 2 shows general aspects of how the invention is to be integrated into the cable network of FIG. 1B. Digital computer 20, contained in a residence 2 connects to cable network 21 through adapter 22, cable modem 23, and (coaxial) transmission line 24. Adapter 22 also connects to one or more telephones 27 within the residence housing computer 20, and to a telephone line (e.g. twisted pair) connecting the residence to a local exchange center (LEC) of the PSTN. Although computer 20 is shown as a "laptop" computer, it is understood that the adapter 22 can be used with any other digital computer type or style (personal or other, desktop or other, etc.).

In cooperation with computer 20, adapter 22 operates to support telephony processes between residential telephone(s) 27 through one or the other of cable network 21 and LEC 28. When electric utility power fails, the adapter provides a default connection between the residential telephones and LEC 28. This connection uses the power commonly provided by the LEC to the residence, so telephone services to the residence are unaffected by electric utility outages. At other times, telephone calls inbound to and outbound from the residential telephones are routed selectively to either the LEC or the cable network as a function of various conditions.

Conditions determining telephone call routing can be established by logic in the adapter. For example, the adapter logic can be configured to a default state routing all local outgoing calls to the LEC, all calls inbound from the LEC to residential phones, all long distance outgoing calls to the cable network and all calls arriving through the cable network to residential phones. Routing conditions also could be subject to configuration by residential users so as to for other routing choices. For example, business calls initiated at a residence that would normally use a private network maintained by a business enterprise could be routed to the enterprise (and private network) via the cable network, while non-business calls could be routed directly to the PSTN.

Telephone signals routed through the cable network are transmitted in a digital form. Consequently, in addition to providing telephone services the cable network can easily offer generalized data transmission services between the residential computer 20 and other data networks (e.g. the Internet).

3. System of Invention—Telecommuting Application

Figure 3:
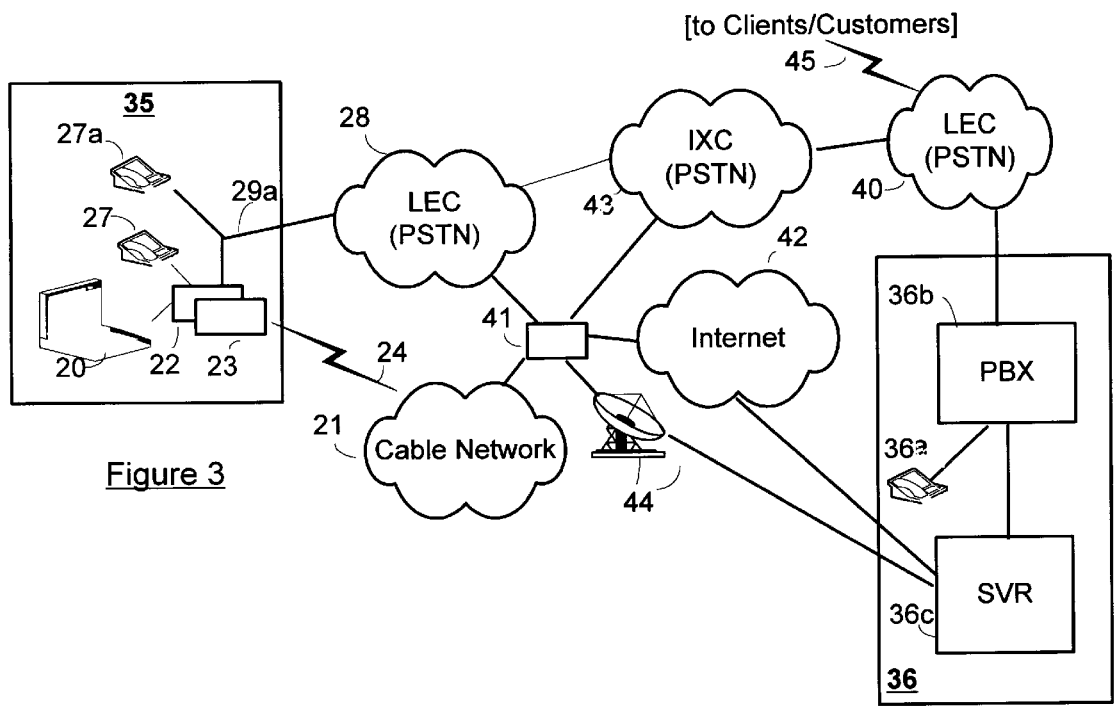
FIG. 3 is a schematic, more detailed than that in FIG. 2, indicating how the invention could be implemented to enable a telecommuting end-user of cable services to seamlessly receive telephone services at home telephones, through the cable service, and at (remote) office telephones through other networks.

Additional aspects of the system adaptation of the invention are shown in FIG. 3. This figure shows how cable network 21 connects residential telephone(s) of FIG. 2 to telephones at other residences and business enterprises. It is also useful to explain how the telephone(s) of FIG. 2 can be used by a business telecommuter relative to remote office telephones used by the same party.

As shown in this figure, adapter 22 at the residence of FIG. 2—that residence designated 35 in this figure—connects telephones such as 27 to LEC 28 through a line labelled 29a. Other telephones 27a in residence 35 (e.g. telephones connected to telephone outlets other than that used by the adapter) may connect directly to the LEC via line 29a.

For the discussion to follow, a user of telephone(s) 27 may be viewed as a business telecommuter having an office at a business enterprise 36 and a business telephone 36a at that office. The enterprise is assumed to serve multiple business telephones—e.g. through a PBX (private branch exchange) shown at 36b—and also to house an enterprise server 36c capable of connecting the enterprise to telephone and other communication networks. Server 36c connects to PBX 36b and not-shown digital computers within the enterprise. As seen in this figure, PBX 36b connects enterprise telephone(s) 36a to the PSTN, via a local exchange center (LEC) 40, and server 36c connects the enterprise the Internet seen at 42.

Server/gateway 41 (hereafter referred to simply as the "gateway"), maintained by the cable network, connects the cable network to other networks. The gateway consists of one or more computers that are programmed to perform telecommunication functions; including telephone call handling functions described later with reference to FIGS. 6, 7a, 7b, 8a and 8b. In FIG. 3, the other networks connecting to the gateway include the Internet at 42, the LEC 28, an Intermediate Exchange Center (IXC) of the PSTN shown at 43, and a leased portion of a broadband network 44 connecting to enterprise server 36c. The leased portion of network 44 supports transmission of digital telephone signals and data between enterprise server 36c and cable network gateway 41.

Thus, telephone calls can be routed in standard analog form between PBX 36b and cable network 21 through the PSTN (via either IXC 43 or LEC 28); and telephone calls and data can be routed in digital form between enterprise server 36c and both the Internet 42 and broadband network 44; and via either of the latter networks to cable network 21.

A particularly useful "telecommuting" function that can be obtained through the illustrated arrangement is that telephone calls directed to telephone 36a—e.g. a call through link 45 to LEC 40, from a customer or client of enterprise 36—can be selectively forwarded or redirected to telephone(s) 27 at residence 35 through multiple transmission paths. These rerouting paths allow for access to telephone(s) 27 in residence 35, while computer 20 is transmitting data (e.g. via the Internet 42). Thus, for example, a telecommuter, using computer 20 and the Internet to carry on data communication with enterprise 36, could be alerted to telephone calls currently waiting to be connected to telephone(s) 27. In the illustrated configuration, these rerouting paths are:

path 1: PBX 36b, PSTN 40-43-28-29a, adapter 22 path 2: PBX 36b, PSTN 40-43-28, gateway 41, cable network 21, adapter 22 path 3: PBX 36b, PSTN 40-43, gateway 41, network 21, adapter 22 path 4: PBX 36b, server 36c, Internet 42, gateway 41, network 21, adapter 22 path 5: PBX 36b, server 36c, network 44, gateway 41, network 21, adapter 22.

Calls redirected to residential telephone(s) 27 through path 1 above can be handled as a "simple" call forwarding service of the PSTN. Within the PSTN, calls rerouted through paths 2 and 3 above can be handled as simple call forwarding operations to a telephone number assigned to gateway 4; and in the cable network these operations can be carried forward (digitally) to the residence by gateway 41 and adapter 22. Calls rerouted through path 4 above can be handled by an Internet data communication process between enterprise server 36c and gateway 41, and an extended communication process between gateway 41 and adapter 22 via cable net 21. Finally, calls rerouted through path 5 can be handled by a data communication process through network 44 carried forward through network 21.

Those skilled in the art should understand that in the networks external to the PSTN (in FIG. 3, the cable network, the Internet and network 44) processes required to redirect telephone calls would operate as functional analogues of existing PSTN processes for call forwarding; i.e. these processes would convey signals to instigate ringing of residential telephone(s), to return busy signals to callers when appropriate, and to establish connections between callers and rung telephone(s) when appropriate. In addition, present rerouting processes would condition adapter 22 to provide call waiting indications to residential computer 20 when that device is active and called numbers are busy; so that in this circumstance call waiting (and if appropriate "caller id") indications can be displayed on the computer's monitor.

In each of the above rerouting processes, telephone calls directed to enterprise telephone 36a would be re-routed to a telephone number at residence 35 associated with residential telephone(s) 27. Upon establishment of a connection to a residential telephone, voice signals of the respective telephone call would be processed through the connection path in appropriate forms; e.g. in analog forms through analog paths within the PSTN, and in digital forms over either the Internet or network 44. On the Internet, telephone signals can be handled by existing Internet Telephone applications. On network 44, telephone signals can be handled in a packet form like that used on the Internet and/or another format now used in network 44.

A significant difference between calls routed through network 44 (path 5) and calls routed through the Internet (path 4) would be that the voice signals would be delivered in isochronal form over network 44 since that network provides direct point-to-point linkage between enterprise 36 and gateway 41. In contrast, it is well understood that voice transmissions over the Internet are deliverable with arbitrary delays because of the indeterminate numbers of nodes traversed by digitized packets sent over that network.

In addition to forwarding calls to a business telecommuter's home telephone(s), the illustrated system of networks can provide the following other functions/services (with appropriate programming of gateway 41): 1) transfer data bidirectionally between computer 20 and any other computer (e.g. a computer in enterprise 36), through adapter 22 and either cable network 21 and the Internet 42, or cable network 21 and network 44; 2) transfer telephone signals bidirectionally, between residential telephone(s) 27a and any other telephone in the PSTN, via LEC 28; 3) transfer telephone signals between residential telephone(s) 27 and other telephones via adapter 22, cable network 21, and either LEC 28 or IXC 43, or the Internet 42, or network 44; 4) transfer facsimile telephone signals between not-shown residential facsimile equipment and other facsimile equipment via any of the paths recited in the previous statements; 5) transfer telephone signals over any of the digital paths (cable network 21 and either the Internet or network 44) while the computer is connected online to either the Internet or network 44.

Residential and cable network adaptations supporting the above rerouting functions are described next.

4. Residential Adaptation

Figure 4:
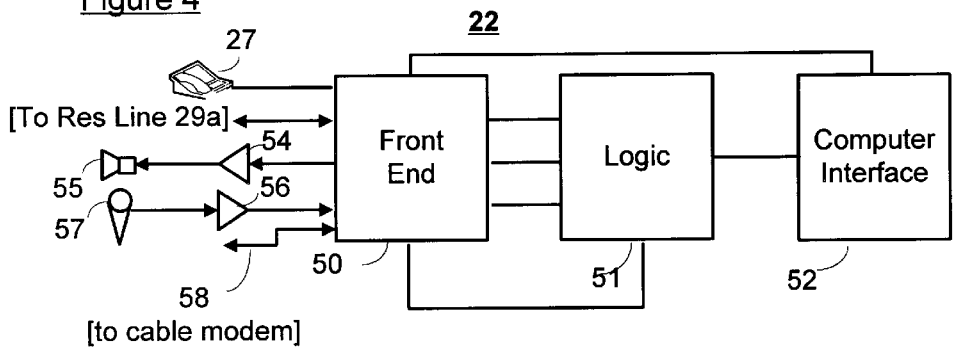
FIG. 4 is a schematic block diagram of the organization of a computer adapter seen as a single block in FIG. 3.
Figure 5:
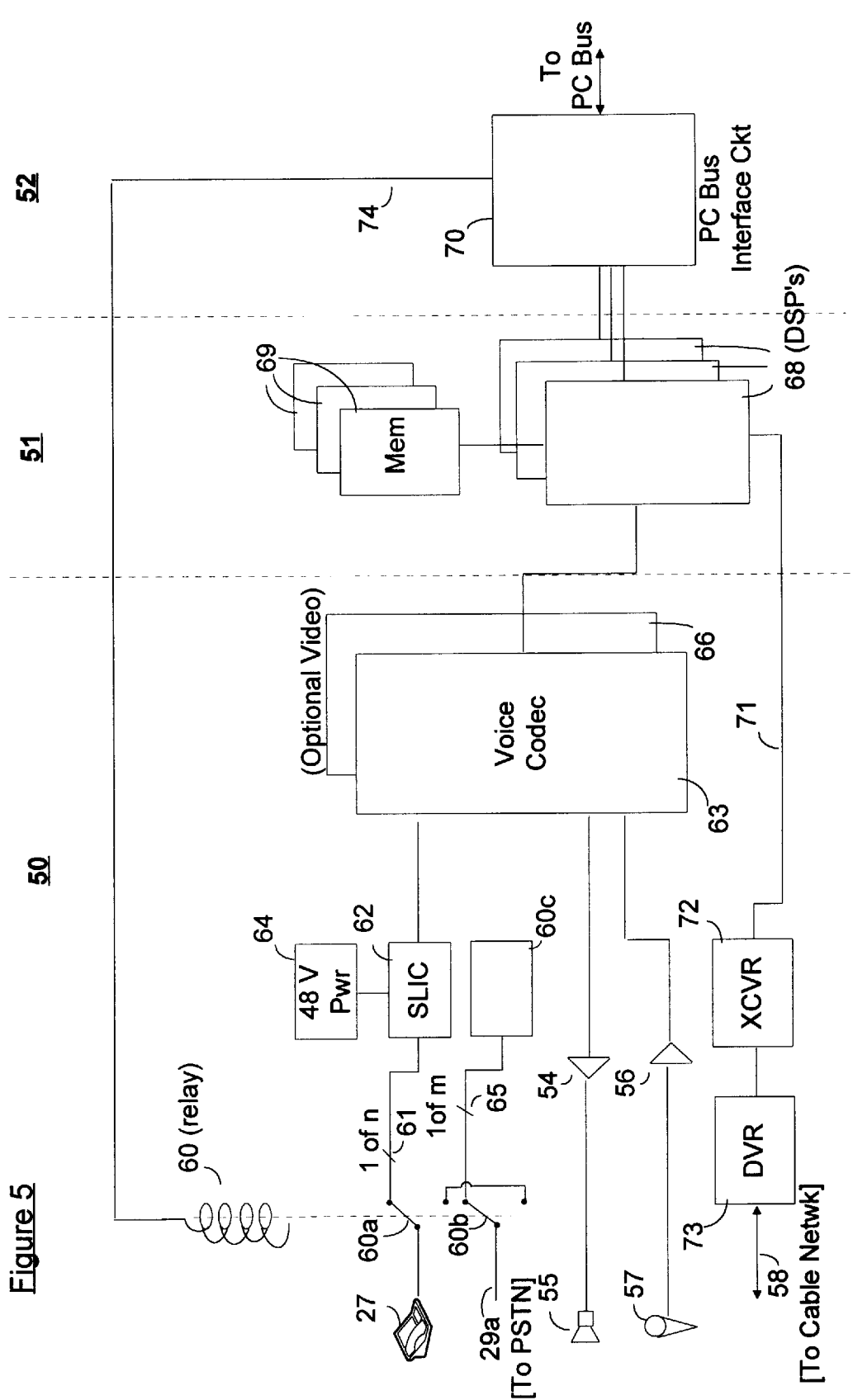
FIG. 5 is a schematic of the adapter shown in FIG. 4, illustrating presently relevant details of circuits in that device.

FIG. 4 shows the general organization of the residential device adapter 22. FIG. 5 shows additional details in block schematic form. Other diagrams discussed in another section of this description show the operational flow of this device.

The adapter preferably is implemented as an attachment card for computers, but it also could be built as a stand-alone unit. It could easily be configured to attach to IBM-compatible type personal computers as well as other types of computers.

For discussion purposes, the device is viewed (in FIGS. 4 and 5) as having three sections:

a "front-end" section 50; a logic section 51; and a computer interface section 52.

Computer interface section 52 attaches directly to a computer bus having a standardized architecture (e.g. a memory or input/output bus of a personal computer).

Logic section 51 is responsible for the logical operations of the adapter (i.e. the logical functions other than signal conversions between analog and digital forms) which are required to sustain data communications relative to digital networks such as 42 and 44, as well as those required to sustain telephone communications relative to any of the networks 28 and 42–44.

Front End Section 50 attaches to residential telephone(s) 27, to the PSTN via line 29a (see also FIG. 3), to amplifier 54 and speaker device 55 (e.g. earphones), to amplifier 56 and microphone device 57, and to line 58 which couples to the cable network through a not-shown cable modem that interfaces to cable network 21 (or which couples to a broadband network other than the cable network through a comparable device; for instance an ADSL type modem device for connecting to Advanced Digital Subscriber Link facilities presently provided by the PSTN).

Relative to the presently contemplated adapter, the not-shown cable (or other) modem is treated as a separate device entity. However, it should be understood that integration of this modem device into logic section 51 is considered potentially feasible (although possibly limiting as a design feature of the adapter if so integrated).

In this adapter, attachments to telephone(s) 27 and telephone line 29a are made through not-shown standard telephone jacks provided at an exterior surface of the adapter; and (optional) attachments to devices such as 55 and 57 are made through plug-in sockets available on the same (or another) exterior surface.

Relevant details of adapter sections 50–52 are seen in FIG. 5.

When adapter relay 60 is off (unenergized), its contacts 60a and 60b connect telephone 27 to lines 29a extending to LEC 28 (FIG. 3). When the adapter is on (energized), telephone 27 is connected through path 61 to the subscriber line interface circuit (SLIC) 62. Circuit 62 is well known in the digital telephony arts. Power for the SLIC circuit is provided at 64. When telephone 27 is connected to circuit 62, a corresponding two-wire line termination for that device is provided through path 65 and termination circuit block 60c. It is understood that multiple SLIC's, or a multi-channel SLIC, would allow path 61 to separately serve n telephones or other input devices and also allow multiple (e.g. m) terminations for devices so served to be presented through path 65.

Circuit 62 connects to voice codec circuit 63, also well known in these arts, for converting telephone signals between analog form suited to telephone 27 and digital form suited for transfer at adapter interface section 52. Voice codec 63 also can convert telephone signals handled between interface 52 and other analog devices such as speaker 55 and microphone 57, into digital signals.

An optional video circuit 66 converts video signals between a not-shown picture phone device, such as the AT&T Multimedia 2500, and digital interface section 52. Digital outputs of circuits 63 and 66 are routed through digital signal processor (DSP) circuits 68 to memory bank 69 for storage in the latter. DSP circuits are also well known in this art.

DSP's 68 connect via bus interface circuit to the input-output bus of residential computer 20 (FIG. 3). Digital signals stored in memory bank 69 are thereby routed through this connection to computer 20 for additional processing, and digital signals produced by computer 20 are thereby routed through the same connection to DSP's 68 for further handling.

DSP's 68 also couple to line 58 (the line seen in FIG. 4 as extending to the cable network) through line 71, transceiver 72 and driver 73. This coupling allows the DSP's to receive and process digital data and telephone signals transferred through cable network 21 (FIG. 3) from other networks (FIG. 3), and also allows the DSP's to transmit data and telephone signals to cable network 21 for transfer to the other networks.

Bus interface circuit 70 controls energization of relay 60 via line 74. Thus, if line 74 is inactive (unpowered), residential telephone 27 is connected to residential telephone lines extending to the PSTN, and if line 74 is powered on residential telephone 27 is connected to the DSP's 68 via codec 63. Line 74 is powered off either when there is a failure in residential utility power (effectively removing power from circuit 70) or when control signals furnished to circuits 70, by either DSP's 68 or the residential computer, explicitly cause circuits 70 to remove power from line 74. Thus, residential telephone 27 is connected to lines 29a during either a failure of residential utility power or existence of conditions determined by the residential computer (e.g. in response to a key entry by the computer user and/or a logical condition detected by the computer).

Operations of the residential adapter and cable network 21—for sustaining telephone and data communication processes relative to residential equipment (telephone devices and computers, etc.)—are described later with reference to flow diagrams included in the present drawings.

It is important to note that the residential adapter as configured is easily programmable to sustain telephone and data communication processes concurrently. The desired effect and objective is to be able to have telephone calls to the residence processed by the adapter while the residential computer is "online" (e.g. connected to the Internet 42 or a computer at enterprise 36);

so that incoming calls can either be connected and completed or at least so that waiting calls and their origins can be signalled to the computer user with an option enabling the user to selectively accept completion of individual calls.

5. Cable Head End Adaptation

The head end of cable network 21 is adapted—e.g. through programming of gateway 41—to connect (residential) adapters such as 22 to any of the networks 28 and 42–44. Information is transferred over connections to digital networks 42 and 44 in digital form, and over connections to networks 28 and 43 (LEC and IXC centers of the PSTN) in analog form if the connection is through an analog link and in digital form if the connection is through a digital link. Telephone signals and data transferred over digital links may be arranged in packets conforming to requirements of the network to or from which the signals are being transferred.

Operations of the gateway relative to residential adapters and the external networks (28 and 42–44) are described next in section 5.1 with reference to flow diagrams included in the present drawings.

Figure 7A:
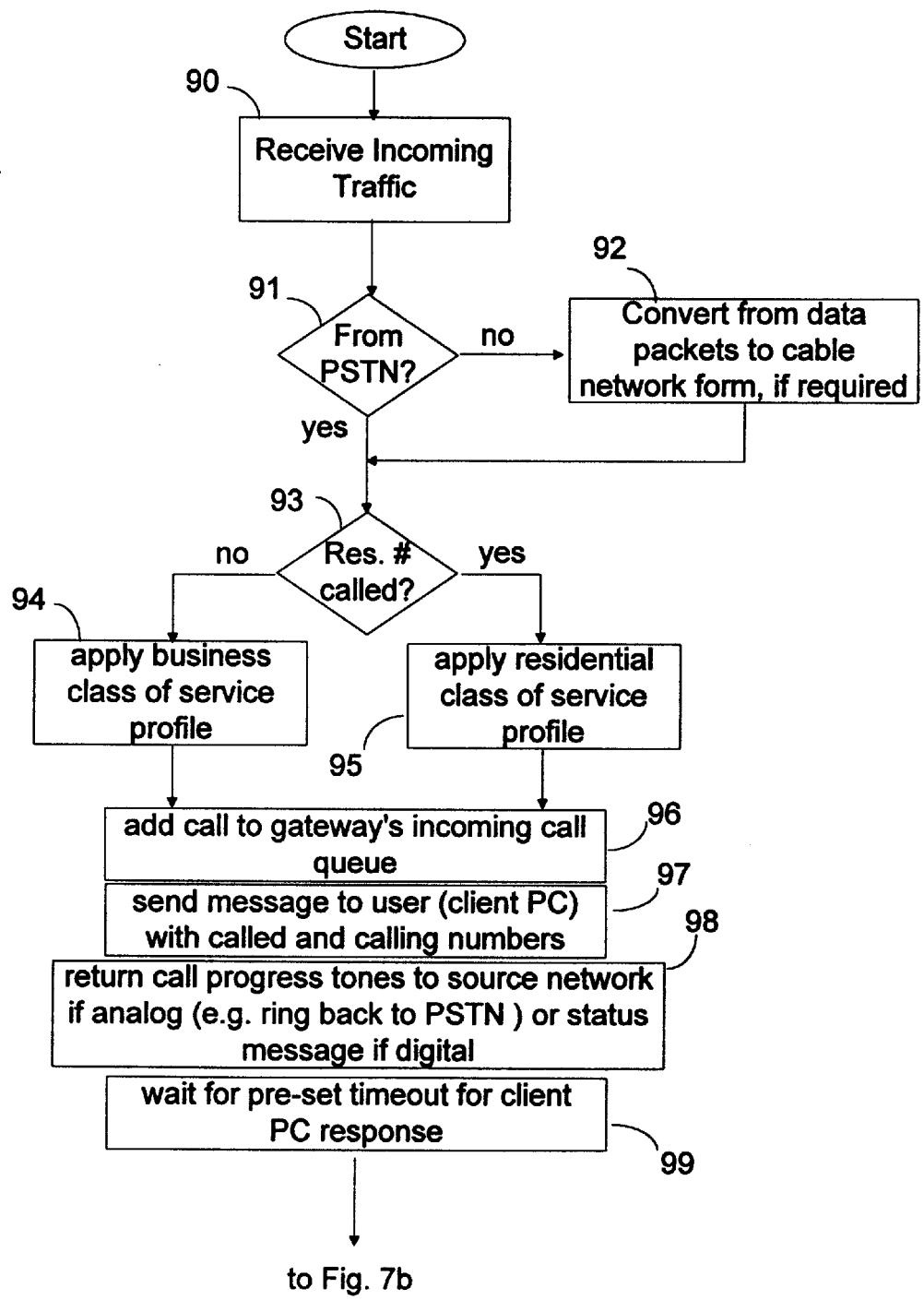

5.1 Operations of Cable Network Server Relative to Residential Adapter and Other Networks Telephone call handling operations of gateway 41(FIG. 3), at the head end of cable network 21 (FIG. 3) are described next with reference to flow diagrams in FIGS. 6, 7a, 7b, 8a and 8b. FIG. 6 is used to explain initialization of the gateway. FIGS. 7a and 7b together are used to explain how the gateway handles incoming telephone calls (calls directed to end-users of the cable network), and FIGS. 8a and 8b together are used to explain how the gateway handles outgoing telephone calls (calls originated by cable network end users). It should be understood that in addition to processing telephone calls as digital data, the gateway would be functionally capable of sustaining other data transmissions (e.g. to transfer data between residential computers and enterprise computers).

A. Gateway Initialization

After being powered up (block 80, FIG. 6) processor(s) in the gateway check its network connections; e.g. its connections to the cable network and other networks such as networks 28 and 42–44, FIG. 3 (block 81 and decision/result box 82, FIG. 6). Errors are duly noted and corrected in accordance with the local practices of network 41 (block 83, FIG. 6). When the connections are correct, user profiles (stored e.g. in not-shown local databases at the gateway) are checked, and appropriate classes of service for incoming and outgoing calls are associated individually to end users of cable network telephone services (block 84, FIG. 6).

For calls forwardable by an enterprise PBX and server (e.g. 36a, 36c FIG. 3), the gateway may have several options for preparing the enterprise equipment: a) the enterprise PBX can be instructed (via communicated messages) to forward calls through the PSTN (or leased network 44) to a special "800" telephone number belonging to the gateway (block 85a); or b) the PBX can be instructed to route calls through the data networks to an address (e.g. an Internet URL) belonging to the gateway (block 85b). These options may for instance be pre-specified by individual end users of cable network telephone services.

At this point, the gateway is ready and waiting to process telephone calls; both incoming and outgoing (block 84).

B. Gateway Handling of Incoming Telephone Calls

Gateway handling of incoming telephone calls is explained with reference to the flow diagram contained in FIGS. 7a and 7b.

Upon receipt of an incoming call (block 90, FIG. 7a), the gateway differentiates its handling of the call as a function of the network through which it arrives (decision box 91, FIG. 7a). If the call arrives through other than the PSTN (i.e. in a digitized packet format such as that used by the Internet and other data networks), its data (called number digits, origin number digits, etc) is converted to a form suited to transfer through the cable network, if such conversion is needed for their delivery to end users of the cable network (block 92, FIG. 7a).

After conversion 92, or immediately if the call arrives through the PSTN, the gateway further differentiates its handling as a function of the type of end user to which the call is directed (decision box 93); applying a business class of service to the call (block 94) if it is directed to a business end user, and a residential class of service (block 95) if the call is directed to a residential end user. The type of end user is determined from the called telephone number and the entry associated with that number in the gateway's (not shown) user profile database.

After determining the class of service applicable, the gateway performs procedures to adapt equipment at the called end user site for handling the respective call. These procedures include: adding the call to a queue of incoming calls (block 96) maintained for the respective called party; sending a message to the called party's computer (client PC) with the called and calling numbers (block 97); returning signals representing call progress tones to the network from which the call was received (block 98); and waiting for a predetermined timeout interval for a response from the called party's computer (block 99).

Determination of whether the called party's computer has or has not responded within the predetermined timeout interval is indicated at box 100 in FIG. 7b, and actions based on that determination are shown in the higher-numbered elements of that figure. If the called party's computer has not responded within the set interval, operations 101 through 106 are performed. If the called party's computer has responded, operations 107 through 110 are performed.

In operation 101, the gateway distinguishes between calls forwarded through business enterprise servers (e.g. server 36c, FIG. 3) and other calls. If the call is through an enterprise server, operation 102 is performed to communicate (exchange messages) with that server for any additional directions that may be applicable to the handling of the respective call (e.g. a list of alternative destinations beginning with the called party's residence telephone number, cellular phone number, pager number, etc.). If there are no additional directions, or if the call was not routed through an enterprise server, operations 104 are performed based on the local profile of the called party. If other actions are required, operations 105 are performed based on the other received directions. Then the actions taken and cable network usage associated therewith are recorded for billing purposes (block 106).

If the called party's computer responds, actions 107 are taken, based on the end user's profile and/or explicitly stipulated preferences. A typical stipulated preference could be to have the call connected through the cable network if the user is not immediately receiving a call. Another typical preference could be to have the call rerouted to the user's other telephones (27a, FIG. 3) when the user's telephone(s) 27 is/are busy. Another typical preference could be to have a caller connected to a voice-mail function maintained by the gateway for the called party, if the call is not explicitly accepted by the called party.

If a voice connection is established through the cable network, based on the response and the foregoing preferences, the gateway performs operations 108 and 109 to monitor signals traversing the connection for indications that either party (the caller or called party) has disconnected (e.g. hung-up their telephone receiver). When a disconnection is detected, operations 110 are performed to record cable network usage (e.g. for billing purposes).

C. Gateway Handling of Outgoing Telephone Calls

Figure 8A:
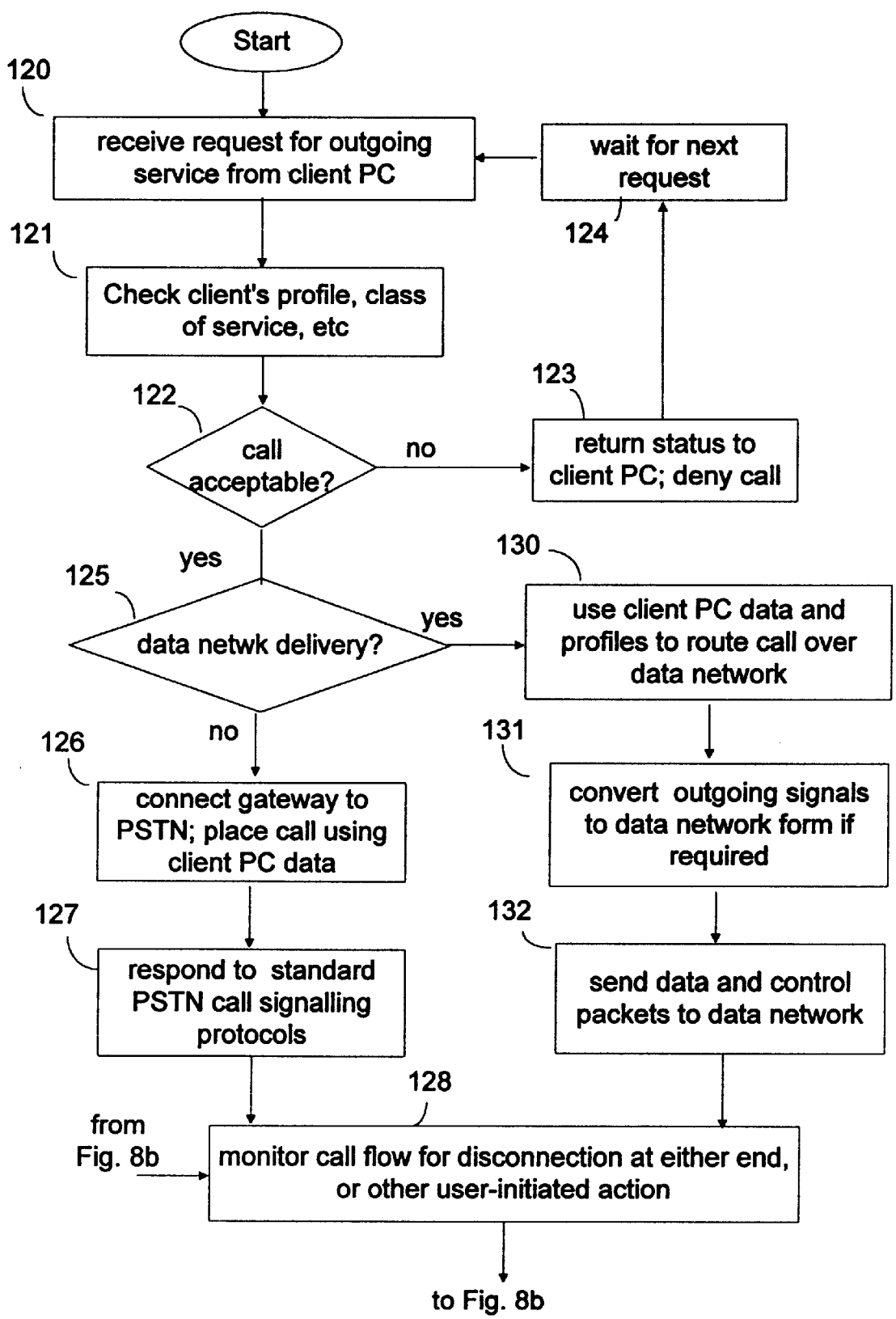

Gateway handling of outgoing telephone calls is indicated by the flow chart in FIGS. 8a and 8b.

Upon receiving a request for outgoing telephone service from a client computer and adapter (block 120, FIG. 8a), the client's profiles are checked to determine if the call is of a type applicable to that client (block 121 and decision 122, FIG. 8a). This check could include determining via the data networks (Internet or network 44, FIG. 3) for enterprise-based rules and permissions applicable to the calling party. If the call is inapplicable (not acceptable) processes 123 and 124 are executed; the former to return indications to the client denying the call and the latter to wait for receipt of a next request and execution of actions 120 and 121 thereon.

If the checked request is of an applicable/acceptable type, the required path of delivery of the requested service is determined (125, FIG. 8a). If that path is analog (e.g. through the PSTN) the gateway performs operations 126 through 128, FIG. 8a. Operations 126 are used to communicate with the PSTN and attempt to route the call through that network. Operations 127 are used to respond to standard call signalling protocols in respect to signals returned by the PSTN. When these procedures result in establishment of a call connection, operations 128 are performed to monitor signal flow on the connection for indications of disconnection at either end, or caller indications requiring other gateway functions. When the procedures fail to establish a connection (e.g. the called number is busy), an appropriate indication is returned to the caller and the request process is terminated by actions not explicitly shown in FIG. 8a or 8b.

Returning to decision 125, when the associated determination is that the required routing is through a data network, the gateway executes operations 130 through 132 (FIG. 8a). In operations 130, data furnished by the client caller's computer and locally stored profile data are used to route the call over an appropriate data network such as the Internet. Then voice signals are transferred over that network in packetized digital form appropriate to the network (operations 131 and 132). Finally, the flow of information in this type of connection (i.e. within the packets originated by the calling and called parties) is monitored (operations 128) for indication that either party has disconnected or other indication indicating need for additional gateway participation in the call process.

Actions contingent on the monitoring processes 128 are indicated in FIG. 8*b*.

If the call is not over (no detected disconnect indication at decision 135), the gateway returns to its monitoring process (128, FIG. 8*a*). If the call is ending, operations 136 are executed to clear status of the respective call at the gateway, to send a disconnect message to the calling client's computer, and to log cable network usage details e.g. for billing purposes. The gateway then continues to process other calls (137, FIG. 8*b*).

6. Telephony Operations at Client Sites of Cable Network

This section describes how equipment at client (end-user) sites of the cable network operates to process telephone calls. Client sites include residences 2 (FIG. 1B) and other structures occupied by users of the cable network; users receiving residential class telephone services and users (e.g. telecommuters) receiving business class telephone services. Equipment used at such sites include for example adapter 22 and computer 20 (FIG. 3) and the unillustrated cable modem previously mentioned.

A Handling of Incoming Calls FIGS. 9*a* and 9*b* together constitute a flow diagram used to explain handling of incoming telephone calls at client sites of the cable network.

In this process, incoming telephone calls received through the cable network (block 150, FIG. 9*a*), by equipment at client/end-user sites of the cable network (e.g. adapter 22 and computer 20, FIG. 3), are added to on-screen queues at respective sites. This means that when adapter and computer equipment at a respective site are operational, and the computer is running a call processing application driving the adapter, indications relevant to each incoming telephone call to the site are displayed on the computer screen even if the computer and adapter are currently busy with other telephone calls and/or even while the computer is connected online to the Internet. Indications relevant to a call may include representations of the called and calling telephone numbers, indications of whether the call is or is not business-related (e.g. to enable a business telecommuter at a respective site to decide whether to prioritize acceptance of the call over other functions currently being performed), etc.

In response to indications newly posted in the on-screen queue, a user may selectively accept or ignore the respective call (block 151 and choice box 152). If the call is ignored, after a preset timeout the adapter and computer operate to send a message to the gateway (block 153) to have the latter take default actions appropriate to the call and the user's class of service, and logging actions appropriate to the cable network usage applicable to the call (block 154). Default actions may include connecting the caller to a voice mail facility in the gateway, enabling the caller to leave a (brief) voice message for the called party. Such actions also may include simply returning a busy indication to the caller if voice mail is inapplicable or unavailable.

A user may also act to accept an incoming call or have other actions performed relative to the call (block 156, FIG. 9*a*); other actions possibly including referring individual callers to voice mail, so that only explicitly referred callers are allowed to use that facility. In this circumstance, the user may act via on-screen queues (e.g. by clicking a pointer on menus or hyperlinked text areas on the screen) to effect the desired action.

Assuming such action calls for acceptance of an incoming call (refer to FIG. 9*b*), the adapter next determines if the user's profile data requires the selected call to be routed through the cable network or through the local PSTN connection (decision box 160).

If the call is to be routed through the local PSTN connection, the adapter and computer act (block 161) to instruct the cable network gateway to reroute the call to the PSTN (refer to gateway operations 107, FIG. 7*b*). In this circumstance, the adapter determines (decision 162) if the selected call is directed to a telephone handset currently attached to the adapter. If the selected call is so directed, the adapter relay (60, FIG. 5) is de-energized (block 163) to effectively connect that handset directly to the PSTN. The indications relevant to the selected call are than cleared from the on-screen queue (by operations not shown here). If the selected call is to a telephone not attached to the adapter, the call is cleared from the on-screen queue and no further action is required to prepare the site for the rerouted call.

Returning to decision 160, if the profiled delivery route for a selected incoming call is through the cable network, the adapter and computer determine (decision 165) if the selected call is to a telephone handset attached to the adapter or to sound transducing devices attached to the adapter (e.g. speaker 55 and microphone 57, FIG. 5). If the call is to (a telephone number associated with) an attached telephone handset, operations 166 through 168 are performed in succession, whereas if the call is to a destination associated with transducing devices (e.g. to an Internet URL address associated with the user's computer) operations 169 and 168 are performed in succession.

Operations 166 serve to energize the adapter relay to connect the attached handset to the adapter's SLIC and other circuits, and thereby to connect the attached handset to the cable network (through the adapter logic and computer). Operations 167 serve to ring the attached telephone if it is idle, and, if the attached telephone is currently busy with an existing call, to place the existing call on hold and cut in the selected incoming call. In operations 168, the adapter and computer monitor the selected call for signals indicating either disconnection at either end of the call path or a user-initiated request (e.g. to place that call on hold, etc.). In operations 169, connections are established through the adapter between sound transducing devices attached to the adapter and the cable network.

If a disconnection or other user action is detected during monitoring process 168, the adapter and computer cooperate to send a message to the gateway indicating the detected condition or function (block 170). If the detected event is a disconnection, the respective call is cleared from the user's on-screen queue (171, FIG. 9*b*) and the user's local facility for handling incoming calls returns to processing other calls or waiting for arrival of such (172, FIG. 9*b*).

B. Handling of Outgoing Calls

Figure 10A:
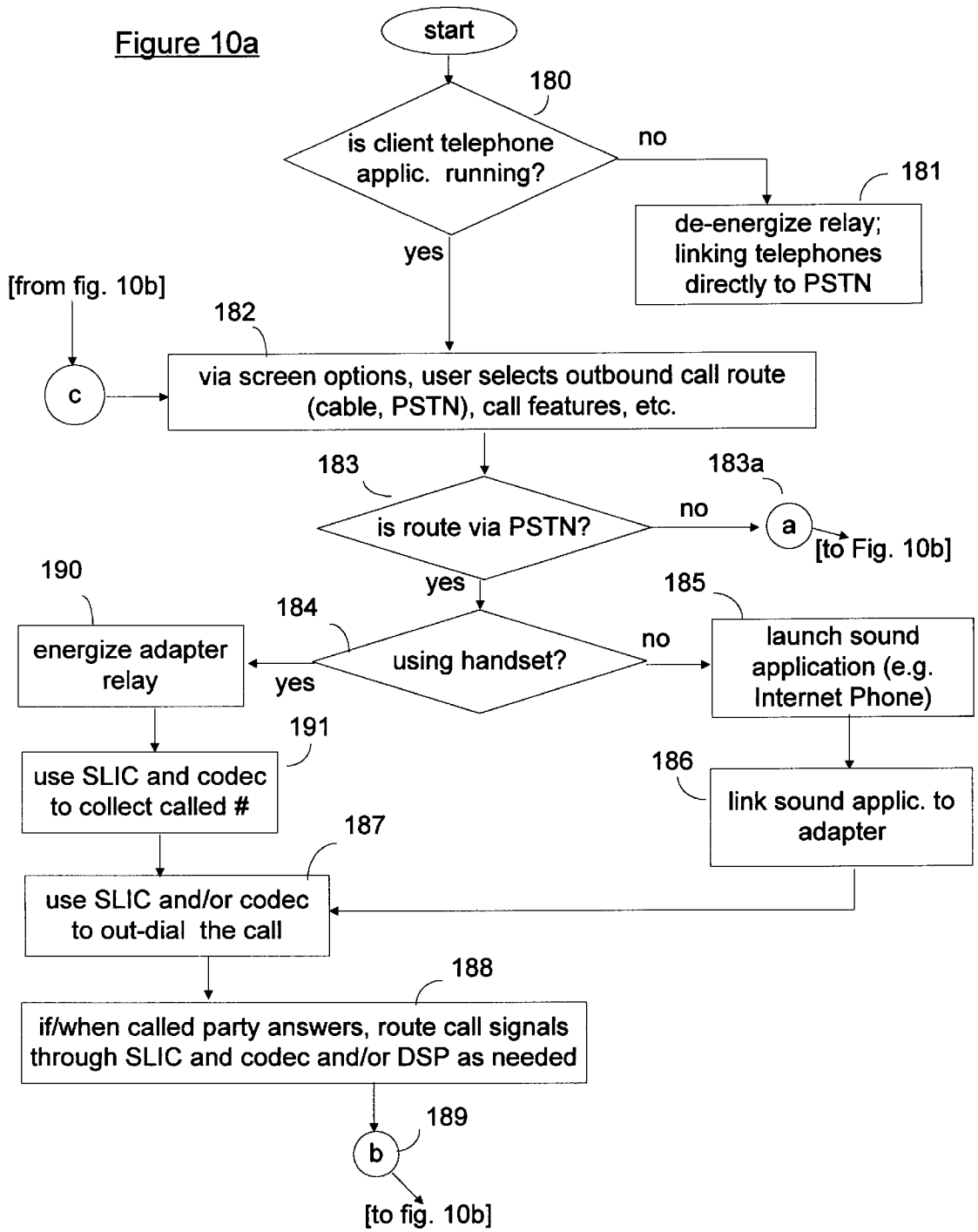
FIGS. 10a and 10b together constitute a flow diagram of how equipment used by cable network end-users operates to process outgoing telephone calls.
Figure 10B:
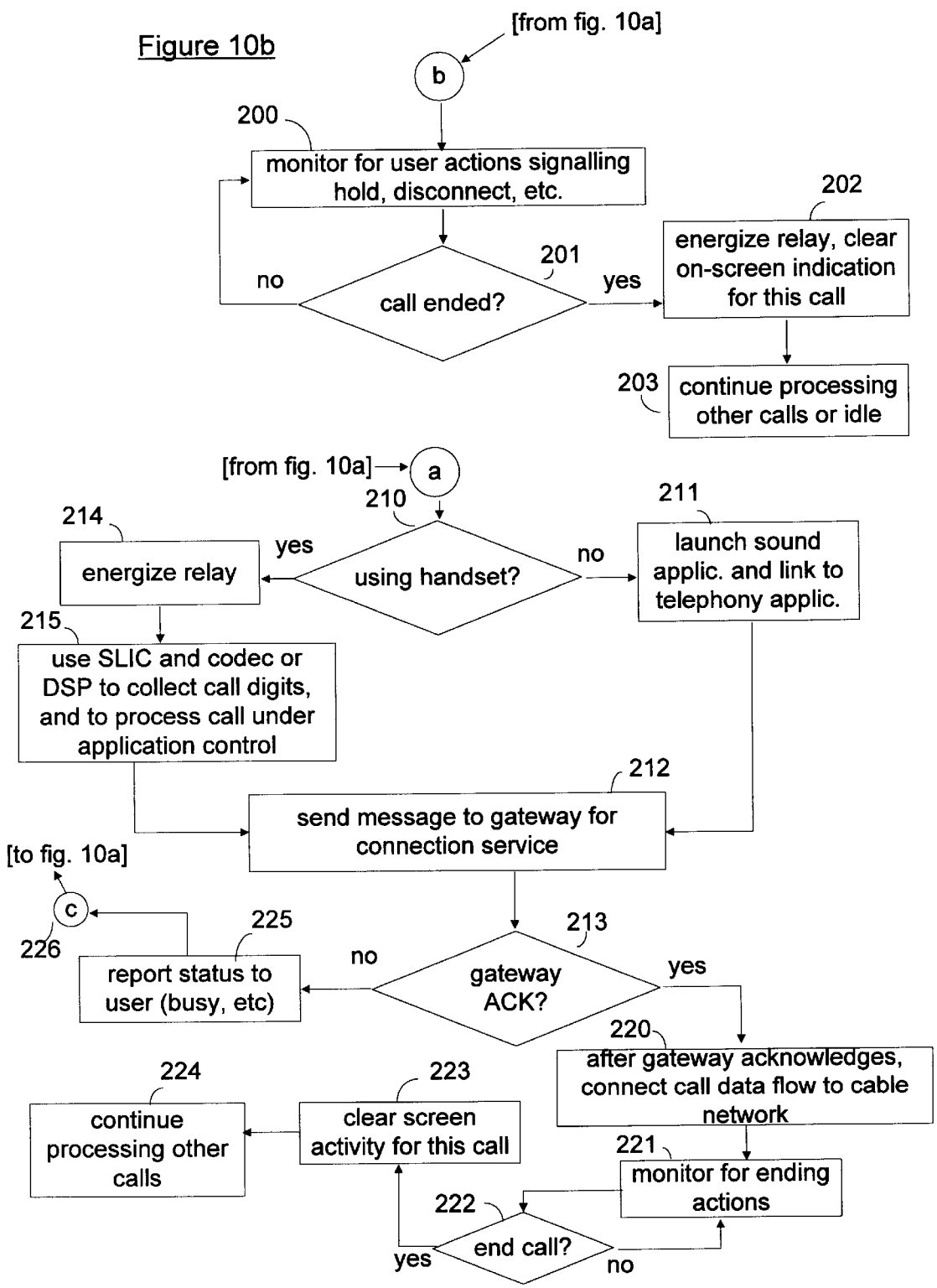

FIGS. 10*a* and 10*b* together constitute a flow diagram for explaining handling of outgoing telephone calls through the cable network, at client sites of that network.

As indicated at 180, such handling of any outgoing call requires that a telephone call handling application be up and running on the client's computer. If the required application is not running, the adapter's relay is de-energized (block 181) to connect attached telephones only to the PSTN so as to route each outgoing call only through that network. If the required application is running, the computer and client user interact (block 182 and decision 183) to select appropriate handling for each initiated outgoing call depending on whether the call is or is not directed to an end user of the PSTN. Calls to end users of the PSTN are those which are to telephone numbers directly used by called parties. Calls that are not to end users of the PSTN include calls directed either to telephone numbers of Internet access providers furnishing telephone services or to specific addresses/URLs in the Internet (or other data network) used by intermediaries operating as call handling agents effectively external to the PSTN.

If the selected call is to a telephone number not directly associated with a PSTN end user ("no" decision at 183, FIG. 10*a*), the client computer call processing application branches, via the encircled symbol "a" shown at 183*a* in FIG. 10*a*, to perform functions shown in FIG. 10*b*. Otherwise (i.e. "yes" decision at 183 associated with call to a telephone number assigned to a PSTN end user), the application continues with functions shown at 184–190 in FIG. 10*a*.

In the latter situation ("yes" decision at 183), the client application determines (box 184) if the call is to be handled through a handset attached to the client adapter or through transducing equipment so attached. If attached transducing equipment is to be used, the client program continues with operations 185 through 188 in succession, whereas if a handset is to be used the program performs operations 190, 191, 187 and 188 in succession.

When operations 185 through 188 are performed in succession, the program and client equipment act to: launch a sound transducing application required for the attached transducing equipment (185, FIG. 10*a*); link the respective sound transducing application to the client's call processing application and equipment (186, FIG. 10*a*); operate the client adapter's codec circuits to out-dial the called number in digital form into the cable network (187, FIG. 10*a*); and react to signals returning through the cable network, and indicating answering of a telephone at the called number, to route signals representing voice between the called party and the attached transducing equipment over a route extending through the cable network, the PSTN, and possibly a data network such as the Internet between the other two.

When operations 190, 191, 187 and 188 are performed in succession, the client call processing application operates to: energize the client adapter's relay to connect the handset to the adapter (190, FIG. 10*b*); collect the called digits from the handset in digital form (191, FIG. 10*a*), outdial the called number through the cable network (187) and respond to called party answering signals returning through the cable network (188).

After performance of actions 188, the client call processing application continues with operations shown at 200–203 in FIG. 10*b* via the symbolic link represented by the encircled symbol "b" at 189. In these operations, the application and client equipment act to: monitor for caller hold indications and/or for indications of actions signifying disconnection of the call at either end (200, FIG. 10*b*); decide between further action and continuation of the monitoring action (201, FIG. 10*a*); if further action is required, energize the client adapter relay (in the event that it is currently de-energized as noted later) and clear indications associated with the instant call from the client screen (202, FIG. 10*b*); and either continue processing other outgoing calls if such are pending or assume an idle state (203, FIG. 10*b*).

When the decision at 183 (FIG. 10*a*) is "no" (i.e. the called destination is an intermediate data network node between the caller and called party), the client application branches to operations shown at 210–226 in FIG. 10*b* via the encircled "a" branch symbol shown at 183*a* in FIG. 10*a*. In these operations, the client application distinguishes initially between outgoing calls using a handset attached to the client adapter and outgoing calls using transducing equipment attached to that adapter (210, FIG. 10*b*).

If the call is to use attached transducing equipment, the client application performs operations 211–213 in succession to: launch a sound transducing application required by the equipment, and link the transducing application to the call handling process (211); send a message to the cable network gateway for connection service (212); and wait for an acknowledgement from the gateway that such service has been provided (213). If the call is to use an attached handset the client application acts to: energize the local adapter relay (214, FIG. 10*b*); operate the local SLIC and codec or DSP circuits to send data to the gateway representing the intermediate data network destination and the final called party destination (215, FIG. 10*b*); signal the gateway for connection service relative to these destinations (212, FIG. 10*b*); and wait for acknowledgement of such service from the gateway (213, FIG. 10*b*).

When acknowledgement of connection service is returned by the gateway, the client application acts to: connect its call data flow to transfer voice signals with appropriate conversions between the attached instrument (handset or transducing equipment) and the cable network (220, FIG. 10*b*); monitor the call signal flow for indications of disconnection (221, 222 FIG. 10*b*); continue monitoring when a disconnection has not been detected (221), and upon detection of disconnection, terminate the call and clear its associated screen indications from the client screen (223, FIG. 10*b*); and thereafter to continue processing other calls if such activities are pending (224 FIG. 10*b*).

If the gateway fails to acknowledge connection service within a preset timeout interval ("no" decision at 213), the client application acts to: report to the caller/user that the call cannot be completed at this time (225, FIG. 10*b*); and branches via the encircled symbol "c" shown at 226 in FIG. 10*b* to the functional routine starting at 182 in FIG. 10*a* (effectively enabling the caller/user to initiate another outgoing call or request retry of the just-rejected call).

We claim:

1. A system for providing telephone services pertaining to call redirection to telecommuters having separate business and residence sites of operation, each said telecommuter needing to be able to communicate seamlessly with telephone callers at both a respective business site and a respective residence site; said system including a broadband network separate from the public switched telephone network (PSTN); said broadband network having office centers and transmission lines extending from said office centers directly to said telecommuter sites; said system further comprising means at said residence site used by one of said telecommuters directly linking to said broadband network for providing said residence site with bidirectional data communication and telephone services through said broadband network; said telephone services including services pertaining to redirection of telephone calls between a business site used by said one telecommuter and said residence site used by said one telecommuter; said linking means also linking said residence site of said one telecommuter to existing infrastructure of said PSTN to allow for alternate use of said existing infrastructure and said broadband network in delivery of said telephone services to said residence site; said linking means enabling said one of said telecommuters to have telephone call communications redirected between said residence and business sites used by said one telecommuter; and allowing for telephone services pertinent to said redirection to be carried out selectively over said broadband network and said existing PSTN infrastructure; said linking means including means for carrying telephone communication signals in digital form between said residence site and said broadband network, and means for carrying telephone communication signals in analog form between said residence site and said existing PSTN infrastructure; and means in said broadband network for conditionally having a telephone call communication directed to a said business site used by said one telecommuter redirected to said residence site used by said one telecommuter when said telephone call communication is not being answered at the respective business site to which it is directed; said redirection of said directed call communication being over a selected one of a plurality of networks including said broadband network and said existing PSTN infrastructure.

2. A system for providing telephone services in accordance with claim 1 wherein said linking means includes a coaxial cable linking said residence site of said one telecommuter to said broadband network; said cable serving to deliver television programs from an office center in said broadband network to said residence site, and to conduct telephone call communications bidirectionally between said residence site and said office center; and wherein said office center of said broadband network contains a head end distribution center for a cable television network managing distribution of said television programs.

3. An adapting system in accordance with claim 2 wherein said business site used by said one telecommuter includes a private telephone exchange connecting to a business telephone used by said one telecommuter, and wherein said telephone call communications redirected for said one telecommuter are routed through said private exchange and said linking means at the respective said business site to said office center of said broadband network.

4. A computer telephony adapter, for adapting digital computers to variably route telephone communications between residences housing individual ones of said computers and both the public switched telephone network (PSTN) and a broadband network separate from said PSTN; wherein each said residence receives separate and different types of communication services from said PSTN and said broadband network; said adapter comprising:

means connecting said adapter with said broadband network, with said PSTN, with a digital computer housed in a said residence receiving said different communication services, and with analog telephone apparatus located in said residence receiving said different communication services;

analog-digital conversion circuits for handling telephone signals; said circuits having an analog port for receiving and transmitting telephone signals in analog form and a digital port for transmitting and receiving corresponding telephone signals in digital form;

means linking said digital port to said digital computer and said broadband network; and switch means having different first and second states; said switch means in said first state connecting said analog port of said conversion circuits directly to said analog telephone apparatus for transmitting converted telephone communications between said analog port and said digital port; said switch means in said second state connecting said analog telephone apparatus directly to said PSTN.

5. An adapter in accordance with claim 4 wherein said switch means includes a relay which defaults to said second state when the adapter is unpowered.

6. An adapter in accordance with claim 4 wherein said broadband network is a cable television network furnishing television program communications to a said residence housing a said computer; and wherein said means linking said digital port of said conversion circuits to said computer housed in said residence and said broadband network includes, logic means for selectively routing digitized telephone signals between said digital port and said digital computer and digital signals representing information between said digital computer and said cable network; wherein said digital information represented by said digital signals includes information contained in said digitized telephone signals and general digital data that need not have specific association with telephony; whereby said logic means effectively serves to sustain telephone and non-telephone data communications between said digital computer and said cable television network.

7. An adapter in accordance with claim 6 wherein said cable television network has a head end office from which said television programs are distributed to said residences, said head end office having communication links to at least two networks external to said cable television network, said at least two external networks including said PSTN and the Internet; wherein said adapter cooperates with said digital computer to sustain telephone communications routed through said cable television networks and said at least two external networks.

8. A system for routing telephone calls through a broadband network connecting to user sites capable of receiving telephone call services directly from the public switched telephone network (PSTN), said call routing being provided by said system on a "seamless" basis such that telephone calls can be directed to a common telephone number at any said user site through both said broadband network and the PSTN; said system comprising:

adapter means, located at individual said user sites containing a programmable digital computer and a telephone attachable to said adapter means, for interfacing at respective user sites between said broadband network and both a said digital computer and telephone; said adapter means and computer at each respective user site cooperatively sustaining signal communication and signal processing functions requisite to transmitting telephone calls through said broadband network; and signal processing means attached to a signal distribution node of said broadband network, said signal distribution node being so located in respect to user sites connected thereto as to be able to receive signals from and send signals to multiple said user sites; said signal processing means also being attached to plural communication networks other than said broadband network; said plural other networks including the PSTN and the Internet; said signal processing means serving to conduct telephone call communications relative to said individual user sites, alternately through said broadband network and any of said plural other networks.

9. A system in accordance with claim 8 wherein said adapter means contains a switch circuit having direct connections to said PSTN; said switch circuit having a default state such that when a utility power outage occurs at the respective individual user site, a telephone attached to said adapter means at the respective site is automatically connected by said switch circuit directly to said PSTN and to power supplied by said PSTN; said switch means being operative when utility power is available at the respective site to connect said attached telephone to a selected one of said PSTN and said broadband network; said broadband network having signaling protocols and forms different from said PSTN, and said adapter means and computer at the respective site being effective, while a respective said switch means is in position to connect a said attached telephone at the respective site to said broadband network, to perform signal conversions relative to said attached telephone for adapting telephone signals sent to and from said attached telephone via said broadband network to forms compatible with transmission requirements of said broadband network.

10. A system in accordance with claim 9 wherein said broadband network is a cable television program distribution network.

11. An adapter device for routing telephone calls between a broadband network and a user site having separate connections to both said broadband network and the public switched telephone network (PSTN), wherein said usersite contains a programmable digital computer and said telephone call routing is provided by said adapter device in cooperation with said digital computer on a "seamless" basis such that telephone calls directed to a common telephone number at said user site can be routed selectively through both said broadband network and the PSTN to a standard telephone device coupled to telephone lines associated with said common telephone number; said adapter device comprising:

first and second communication coupling means; said first coupling means being used for coupling said adapter device to a telephone device at said user site, said broadband network and said PSTN; said second coupling means being used for coupling said adapter device to said programmable digital computer at said user site; and wherein said first coupling means comprises:

a switch circuit having first and second states; said first state being effective to connect a said telephone device at said user site directly to signal transmission and power supplying lines of said PSTN; said second state being effective to couple the same telephone device to said broadband network.

12. An adapter device in accordance with claim 11 wherein said broadband network is a cable television program distribution network.

13. An adapter device in accordance with claim 12 wherein said switch circuit in said first coupling means is a relay circuit which defaults to said first state—coupling said attached telephone to said PSTN—when a utility power outage occurs at said user site.

* * * * *